United States Patent
Yau et al.

(10) Patent No.: US 11,431,971 B2
(45) Date of Patent: Aug. 30, 2022

(54) METHOD AND IMAGE PROCESSING APPARATUS FOR VIDEO CODING

(71) Applicant: Industrial Technology Research Institute, Hsinchu (TW)

(72) Inventors: Chang-Hao Yau, New Taipei (TW); Bing-Jung Fuh, Miaoli County (TW); Ching-Chieh Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 18 days.

(21) Appl. No.: 16/910,068

(22) Filed: Jun. 24, 2020

(65) Prior Publication Data
US 2020/0404264 A1  Dec. 24, 2020

Related U.S. Application Data

(60) Provisional application No. 62/865,359, filed on Jun. 24, 2019.

(51) Int. Cl.
*H04N 19/117* (2014.01)
*H04N 19/134* (2014.01)
(Continued)

(52) U.S. Cl.
CPC ......... *H04N 19/117* (2014.11); *H04N 19/134* (2014.11); *H04N 19/176* (2014.11); *H04N 19/59* (2014.11)

(58) Field of Classification Search
CPC .. H04N 19/117; H04N 19/134; H04N 19/176; H04N 19/59; H04N 19/157; H04N 19/107; H04N 19/132
See application file for complete search history.

(56) References Cited

U.S. PATENT DOCUMENTS

| | | | |
|---|---|---|---|
| 10,257,541 B2 | 4/2019 | Rusanovskyy | |
| 2015/0124880 A1* | 5/2015 | Kim | H04N 19/159 |
| | | | 375/240.12 |
| 2020/0014922 A1 | 1/2020 | Ramasubramonian et al. | |

FOREIGN PATENT DOCUMENTS

| | | | | |
|---|---|---|---|---|
| CN | 104702950 | | 6/2015 | |
| CN | 106060564 A | * | 10/2016 | ........... H04N 19/593 |

(Continued)

OTHER PUBLICATIONS

Liquan Shen et al., "Fast CU Size Decision and Mode Decision Algorithm for HEVC Intra Coding", IFFF Transactions on Consumer Electronics (vol. 59 , Issue: 1 , Feb. 2013 ), Mar. 25, 2013, pp. 207-213.

(Continued)

*Primary Examiner* — Sath V Perungavoor
*Assistant Examiner* — Tyler B Edwards
(74) *Attorney, Agent, or Firm* — JCIPRNET (57) ABSTRACT

A method and an image processing apparatus for video coding are provided. The method is adapted to the image processing apparatus and includes following steps. A current coding unit is received, and filter selection is performed according to a size of the current coding unit. At least one selected filter is used to perform a filtering operation on a plurality of reference boundaries of the current coding unit to generate a plurality of filtering reference values. An interpolation operation is performed on the current coding unit according to the filtering reference values to generate a plurality of interpolated prediction values.

17 Claims, 9 Drawing Sheets

(51) Int. Cl.
*H04N 19/176* (2014.01)
*H04N 19/59* (2014.01)

(56) References Cited

FOREIGN PATENT DOCUMENTS

| CN | 106060564 | 2/2019 |
|---|---|---|
| CN | 110495177 | 11/2019 |
| TW | I528789 | 4/2016 |
| TW | 201943278 | 11/2019 |

OTHER PUBLICATIONS

Guang Chen et al., "Fast HEVC Intra Mode Decision Using Matching Edge Detector and Kernel Density Estimation alike Histogram Generation", 2013 IEEE International Symposium on Circuits and Systems (ISCAS), May 19-23, 2013, pp. 53-56.

Jani Lainema et al., "Intra Coding of the HEVC Standard" IEEE Transactions on Circuits and Systems for Video Technology (vol. 22, Issue: 12 , Dec. 2012), Oct. 2, 2012, pp. 1792-1801.

Gary J. Sullivan et al., "Overview of the High Efficiency Video Coding (HEVC) Standard" IEEE Transactions on Circuits and Systems for Video Technology (vol. 22, No. 12, Dec. 2012), Oct. 2, 2012, pp. 1649-1668.

Thomas Wiegand et al., "Overview of the H.264/AVC Video Coding Standard", IEEE Transactions on Circuits and Systems for Video Technology (vol. 13, No. 7, Jul. 2003), May 10, 2003, pp. 560-576.

Li-Li Wang et al., "Novel Adaptive Algorithm for Intra Prediction With Compromised Modes Skipping and Signaling Processes in HEVC", IEEE Transactions on Circuits and Systems for Video Technology (vol. 23, No. 10, Oct. 2013), Mar. 28, 2013, pp. 1686-1694.

"Office Action of Taiwan Counterpart Application", dated May 26, 2021, p. 1-p. 8.

* cited by examiner

METHOD AND IMAGE PROCESSING APPARATUS FOR VIDEO CODING

CROSS-REFERENCE TO RELATED APPLICATION

This application claims the priority benefits of U.S. provisional application Ser. No. 62/865,359, filed on Jun. 24, 2019. The entirety of the above-mentioned patent application is hereby incorporated by reference herein and made a part of this specification.

TECHNICAL FIELD

The disclosure relates to a technique of video coding.

BACKGROUND

Along with rapid development of virtual reality and augmented reality in audio-video entertainment industry, consumers' demands for high-quality images are increasing day by day in order to be more integrated with, explore, and manipulate virtual environments to achieve an immersive effect. In order to provide smooth and high-definition images, and receive or transmit image data under limited storage capacity and network bandwidth, video coding technology is one of the key technologies.

SUMMARY

The disclosure is directed to a method and an image processing apparatus for video coding.

In an exemplary embodiment of the disclosure, the above method is adapted to an image processing apparatus and includes following steps. A current coding unit is received, and filter selection is performed according to a size of the current coding unit. At least one selected filter is used to perform a filtering operation on a plurality of reference boundaries of the current coding unit to generate a plurality of filtering reference values. An interpolation operation is performed on the current coding unit according to the filtering reference values to generate a plurality of interpolated prediction values.

In an exemplary embodiment of the disclosure, the image processing apparatus includes a memory and a processor, wherein the processor is coupled to the memory. The memory is configured to store data. The processor is configured to receive a current coding unit, and perform filter selection according to a size of the current coding unit, and use at least one selected filter to perform a filtering operation on a plurality of reference boundaries of the current coding unit to generate a plurality of filtering reference values, and perform an interpolation operation on the current coding unit according to the filtering reference values to generate a plurality of interpolated prediction values.

To make the aforementioned more comprehensible, several embodiments accompanied with drawings are described in detail as follows.

DETAILED DESCRIPTION

At present, the joint video expert team (JVET) meeting commonly constructed by the international telecommunication union telecommunication standardization sector (ITU-T) and the moving picture experts group (MPEG) proposes the versatile video coding (H.266/VVC) to provide a standard with higher coding efficiency than the high efficiency video coding (H.265/HEVC). In response to call for proposal (CfP) of compression technology performance competition in the JVET meeting, three technical projects such as standard dynamic range (SDR) images, high dynamic range (HDR) images and 360-degree images are mainly discussed, and all of the three technical projects require prediction to encode image data.

The aforementioned prediction methods are roughly divided into inter-prediction and intra-prediction to eliminate redundancy between and within images to achieve an effect of compression. The former prediction mainly performs correlation analysis on blocks between the images in a time domain to implement motion-compensation prediction, while the latter prediction mainly performs correlation analysis on adjacent blocks in the image in a spatial domain. Generally, the current luma-based intra-prediction includes four tools: conventional intra-prediction, multiple reference line intra-prediction, intra sub-partition prediction and non-linear weighted intra-prediction (NWIP).

Regarding a general 360-degree image, since a preset image frame is spherical, and is projected to a rectangular frame during a compression process, non-linear intra-prediction is required. However, regarding the non-linear weighted intra-prediction, it mainly includes three procedures: feature detection, a matrix-vector multiplication operation and an inverse discrete cosine transform (IDCT) operation. The feature detection requires using multiple reference lines located above and to the left of the coding unit, so that a large amount of storage spaces are needed to store parameters. Moreover, the matrix-vector multiplication operation and the IDCT operation are of high computational complexity. Therefore, the disclosure proposes an image coding method capable of reducing a memory storage amount and computational complexity under a premise of not losing the accuracy of intra-prediction.

Some exemplary embodiments of the disclosure are described in detail with reference of the accompanying drawings. In the following description, when the same element symbols appear in different drawings, the related element symbols will be regarded as the same or similar elements. These exemplary embodiments are only a part of the disclosure, and do not disclose all of the implementations of the disclosure. More precisely, these exemplary embodiments are only examples of methods and devices within the patent application scope of the disclosure.

Figure 1:
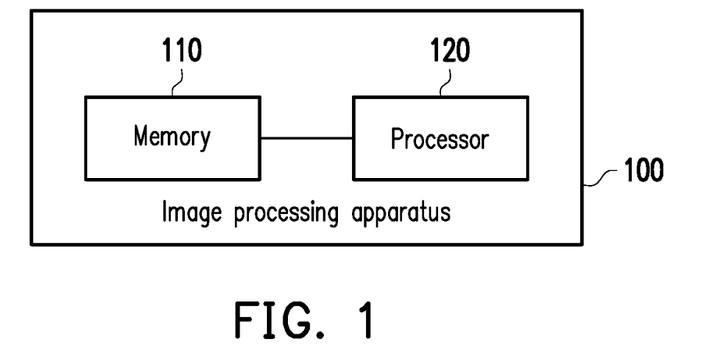
FIG. 1 is a block diagram of an image processing apparatus according to an exemplary embodiment of the disclosure.

FIG. 1 is a block diagram of an image processing apparatus according to an exemplary embodiment of the disclosure.

Referring to FIG. 1, in the exemplary embodiment, the image processing apparatus 100 at least includes a memory 110 and a processor 120, where the processor 120 is coupled to the memory 110. In an exemplary embodiment, the image processing apparatus 100 may be an electronic device such as a personal computer, a notebook computer, a server computer, a tablet computer, a smart phone, a wearable device, a workstation, etc.

The memory 110 is configured to store images, data, program codes, etc., and may be, for example, any type of fixed or movable random access memory (RAM), read-only memory (ROM), flash memory, hard disk or other similar devices, integrated circuits and combinations thereof.

The processor 120 is configured to control an overall operation of the image processing apparatus 100 to perform video coding, and may be, for example, a central processing unit (CPU), an application processor (AP), or other programmable general-purpose or special-purpose microprocessor, a digital signal processor (DSP), an image signal processor (ISP), a graphics processing unit (GPU) or other similar devices, integrated circuits and combinations thereof.

It should be noted that in an exemplary embodiment, the image processing apparatus 100 may selectively include an image capturing device, a transmission interface, a display, and a communication unit. The image capturing device may be, for example, a digital camera, a digital video camera, a network camera, or a surveillance camera to capture image data. The transmission interface may be an I/O interface, and the processor 120 receives image data and related information through the transmission interface. The display may be any screen used for displaying processed image data. The communication unit may be a modem or a transmission receiver supporting any wired or wireless communication standard, which is used for receiving original image data from external sources and transmitting processed image data to other devices or platforms. Those of ordinary skill in the art should understand that, from a viewpoint of coding, the processor 120 may transmit a coded bit stream and related information to other devices or platforms with decoders through the communication unit after completing coding. In addition, the processor 120 may also store the coded bit stream and related information to a storage recording medium such as a DVD disc, a traditional hard drive, a portable hard drive, a memory card, etc., which is not limited by the disclosure. From a viewpoint of decoding, after receiving the coded bit stream and the related information, the processor 120 may decode the coded bit stream and the related information according to the related information and output a decoded result to a player for playing.

Figure 2:
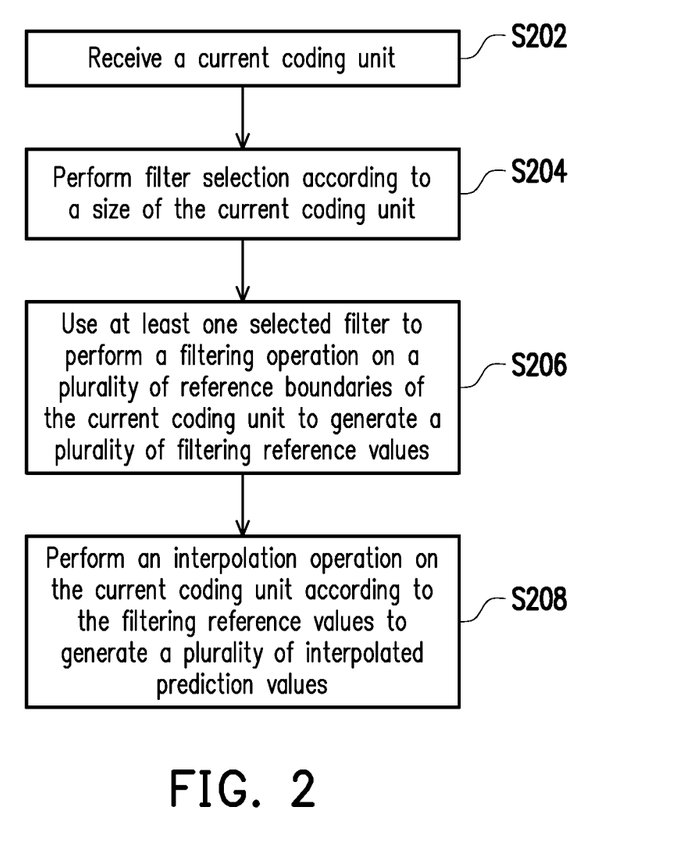
FIG. 2 is a flowchart illustrating a method for video coding according to an exemplary embodiment of the disclosure.

FIG. 2 is a flowchart illustrating a method for video coding according to an exemplary embodiment of the disclosure. The method flow of FIG. 2 may be implemented by the image processing apparatus 100 of FIG. 1. In an embodiment of the disclosure, the coding may be coding and/or decoding, and the coding method may be a coding method and/or a decoding method.

In the exemplary embodiment, the processor 120 may execute a coding flow and/or decoding flow of the image processing apparatus 100. For example, the method flow of FIG. 2 may be stored in the memory 110 in form of program code, and the processor may execute the program code to implement each step of FIG. 2. When the processor 120 executes the coding flow, before executing the flow of FIG. 2, the processor 120 may first receive an original video stream/image, and then perform a coding procedure on the original video stream/image. When the processor 120 executes the decoding flow, before executing the flow of FIG. 2, the processor 120 may first receive a coded bit stream, and then perform a decoding procedure on the coded bit stream. In the following description, one of coding units (CU) in a plurality of coding tree units (CTU) serving as basic processing units in the received original video stream/image or the coded bit stream is described and collectively referred to as a "current coding unit".

Referring to FIG. 1 and FIG. 2, first, the processor 120 of the image processing apparatus 100 receives the current coding unit (step S202), and performs filter selection according to a size of the current coding unit (step S204). The processor 120 may respectively select corresponding filters according to a width and a height of the current coding unit. The selectable filters may include bypass filters (direct output without filtering) and smooth filters of different taps, and the processor 120 may use at least one selected filter to perform a filtering operation on a plurality of reference boundaries of the current coding unit to generate a plurality of filtering reference values (step S206), so as to effectively simplify the storage space required for feature detection and reduce complexity of subsequent related operations. Thereafter, the processor 120 performs an interpolation operation on the current coding unit according to the above filtering reference values to generate a plurality of interpolated prediction values (step S208), so as to replace the complicated IDCT operation. The processor 120 performs coding and decoding on the current coding unit. Namely, the exemplary embodiment uses filter selection and the interpolation operation to reduce a memory storage amount and computational complexity under the premise of not losing the accuracy of intra-prediction, so as to effectively improve coding and decoding performance of video images. Details of steps S204-S208 will be described below with reference of the following exemplary embodiments.

Figure 3:
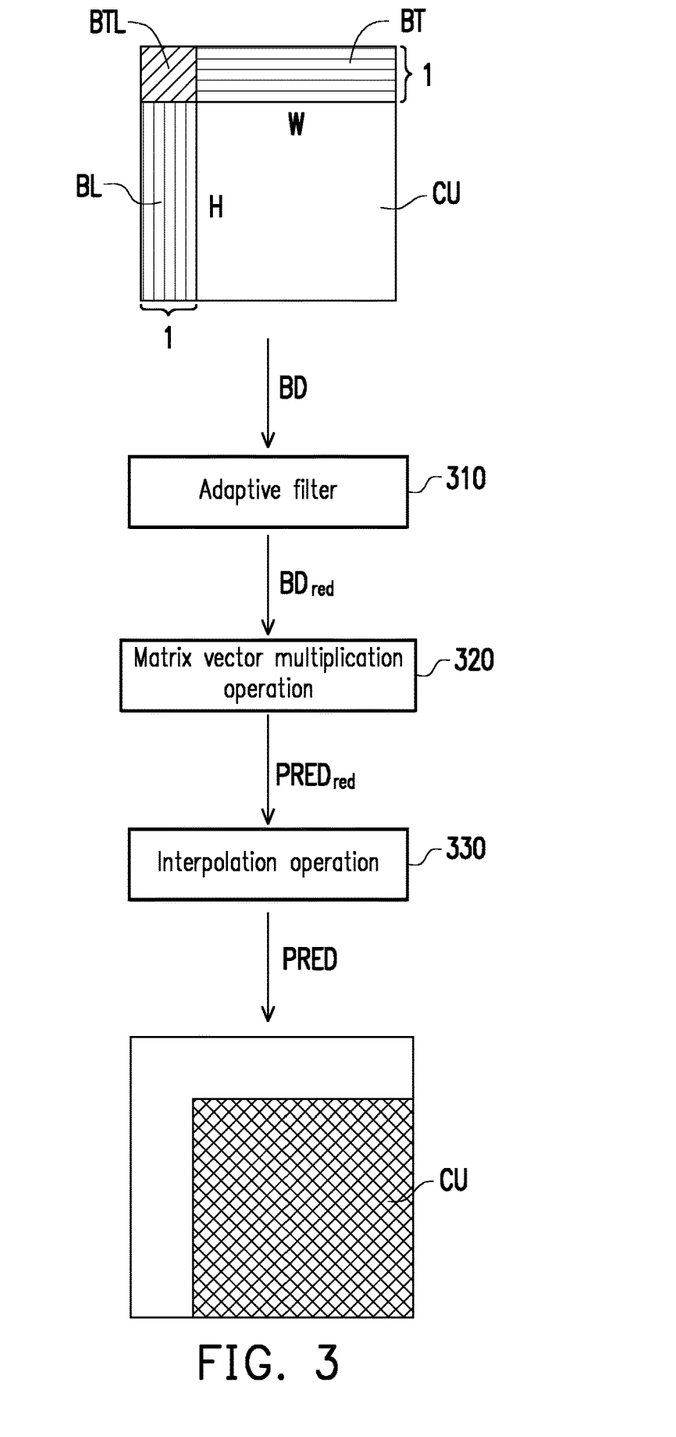
FIG. 3 is a functional block diagram of a method for video coding according to an exemplary embodiment of the disclosure.

FIG. 3 is a functional block diagram of a method for video coding according to an exemplary embodiment of the disclosure, and the exemplary embodiment may be implemented by the image processing apparatus 100 for coding and/or decoding of FIG. 1.

Referring to FIG. 1 and FIG. 3, after receiving the current coding unit CU, the processor 120 of the image processing device 100 selects an adaptive filter 310. The processor 120 may first perform parameter selection according to the size of the current coding unit and a boundary size of each reference boundary to generate at least one filter index of the current coding unit CU, and each filter index corresponds to a different filter. In the exemplary embodiment, the reference boundaries of the current coding unit CU are a top reference row BT and a left reference column BL of the current coding unit CU, and the top reference row BT and the left reference column BL have an adjacent boundary pixel BTL. The processor 120 respectively selects corresponding filters in allusion to the top reference row BT and the left reference column BL to perform the filtering operation.

Figure 4:
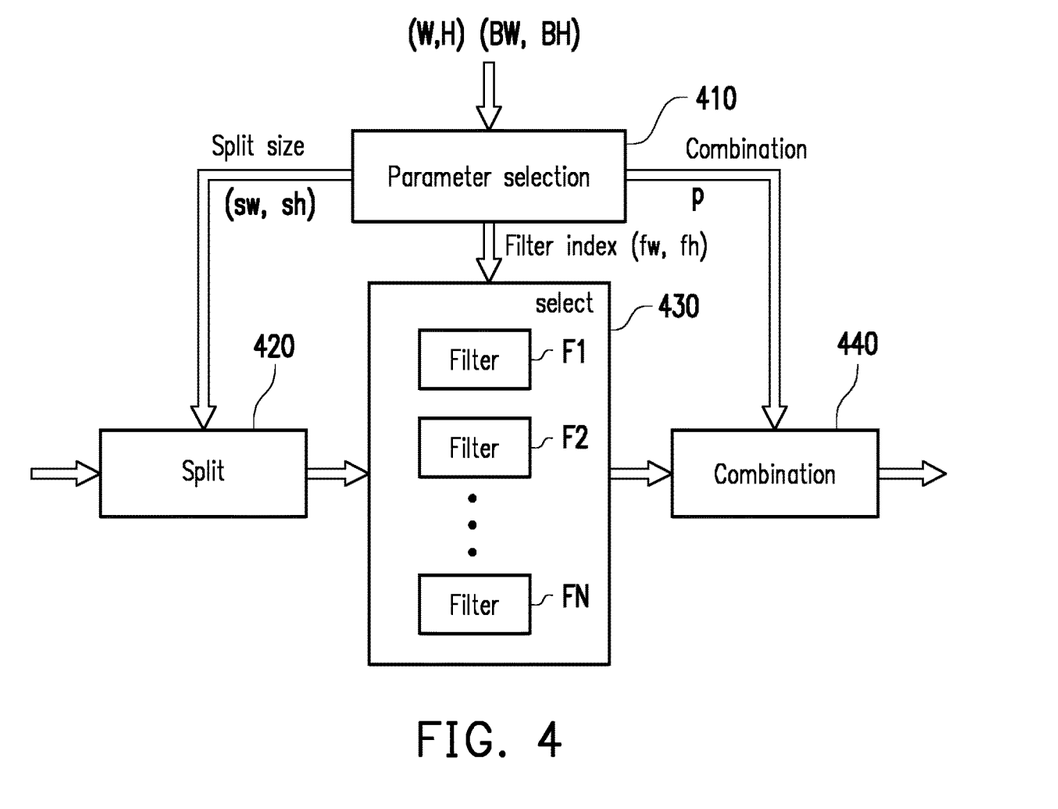
FIG. 4 is a functional block diagram of a selection flow of an adaptive filter according to an exemplary embodiment of the disclosure.

To be specific, FIG. 4 is a functional block diagram of a selection flow of an adaptive filter according to an exemplary embodiment of the disclosure, and the exemplary embodiment may be implemented by the image processing apparatus 100 for coding and/or decoding of FIG. 1.

Referring to FIG. 1, FIG. 3 and FIG. 4, the processor 120 performs parameter selection 410 according to the sizes W and H of the current coding unit CU and the boundary sizes BW and BH of each of the reference boundaries BT and BL to generate a combination p, split sizes sw and sh, and filter indexes fw and fh of the current coding unit CU.

First, the processor 120 calculates the combination p of the reference boundaries BT and BL of the current coding unit CU according to the size of the current coding unit CU. The processor 120 determines whether the width W and the height H of the current coding unit CU are both 4. If yes, the processor 120 sets the combination p of the reference boundaries BT and BL of the current coding unit CU to two. If not, the processor 120 sets the combination p of the reference boundaries BT and BL of the current coding unit CU to 4. The processor 120 may determine the combination p according to a following equation (1):

$$p = \begin{cases} 2, & W = H = 4 \\ 4, & \text{others} \end{cases} \quad \text{equation (1)}$$

Then, the processor 120 calculates the split sizes sw and sh of the current coding unit CU according to the boundary sizes BW and BH and the combination p of the reference boundaries BT and BL of the current coding unit CU. The processor 120 may perform a dividing or shift operation on the boundary sizes BW, BH and the combination p of the reference boundaries BT, BL to generate the split sizes sw and sh of the current coding unit CU respectively corresponding to the top reference row BT and the left reference column BL. The processor 120 may determine the split sizes sw and sh according to a following equation (2):

$$sw = \frac{BW}{p}, \quad sh = \frac{BH}{p} \quad \text{equation (2)}$$

Thereafter, the processor 120 calculates the filter indexes fw and fh of the current coding unit CU according to the split sizes sw and sh of the current coding unit CU. The processor 120 may perform logarithm operations on the split sizes sw and sh, respectively, to generate the filter indexes fw and fh of the current coding unit CU respectively corresponding to the top reference row BT and the left reference column BL. The processor 120 may determine the filter indexes fw and fh according to a following equation (3):

$$fw = \log_2 sw, fh = \log_2 sh \quad \text{equation (3)}$$

The filter indexes may be, for example, 0-4, which respectively correspond to a bypass filter, a $2^{nd}$-tap mean filter, a $4^{th}$-tap mean filter, an $8^{th}$-tap mean filter, and a $16^{th}$-tap mean filter, but the disclosure is not limited thereto.

In the exemplary embodiment, the processor 120 divides (420) the reference boundaries BT and BL of the current coding unit CU according to the split sizes sw and sh, and performs filter selection 430 on filters F1-FN according to the filter indexes fw and fh, and results of filtering operations thereof are a plurality of combinations 440 that match the combination p, respectively.

For example, FIG. 5A-FIG. 5D are schematic diagrams of the filtering operations according to an exemplary embodiment of the disclosure.

Figure 5A:
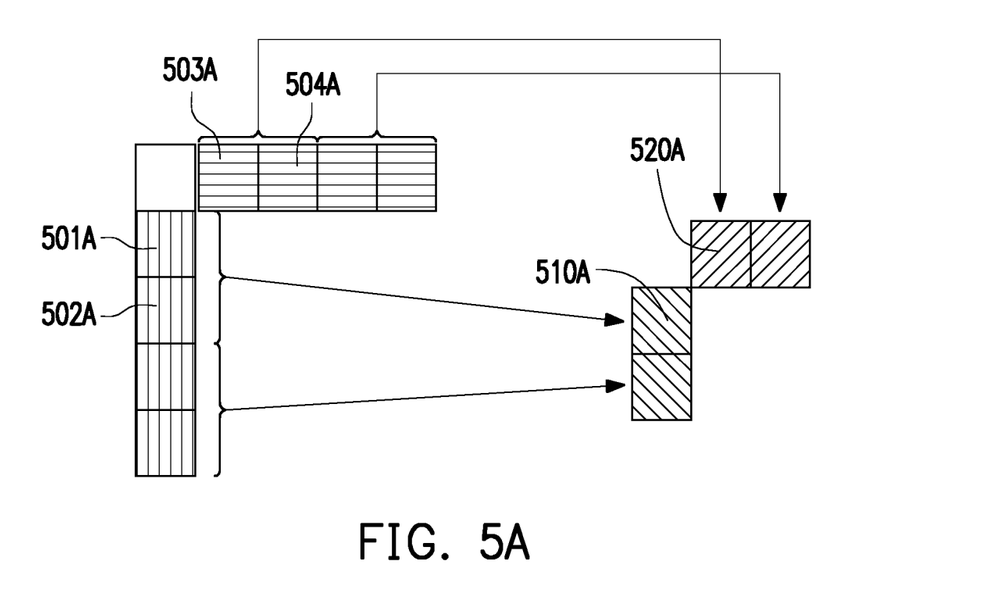
FIG. 5A-FIG. 5D are schematic diagrams of filtering operations according to an exemplary embodiment of the disclosure.

Referring to FIG. 5A, it is assumed that the size of the coding unit is 4×4, and the boundary sizes of the reference boundaries are respectively 4. The split sizes will be respectively 2, and the filter index corresponds to the $2^{nd}$-tap mean filter. Taking boundary blocks 501A and 502A in the left reference column as an example, a filtering result 510A is generated, and taking boundary blocks 503A and 504A in the top reference row as an example, a filtering result 520A is generated, and the other boundary blocks may be deduced by analogy. The combinations of the two reference boundaries are respectively 2.

Figure 5B:
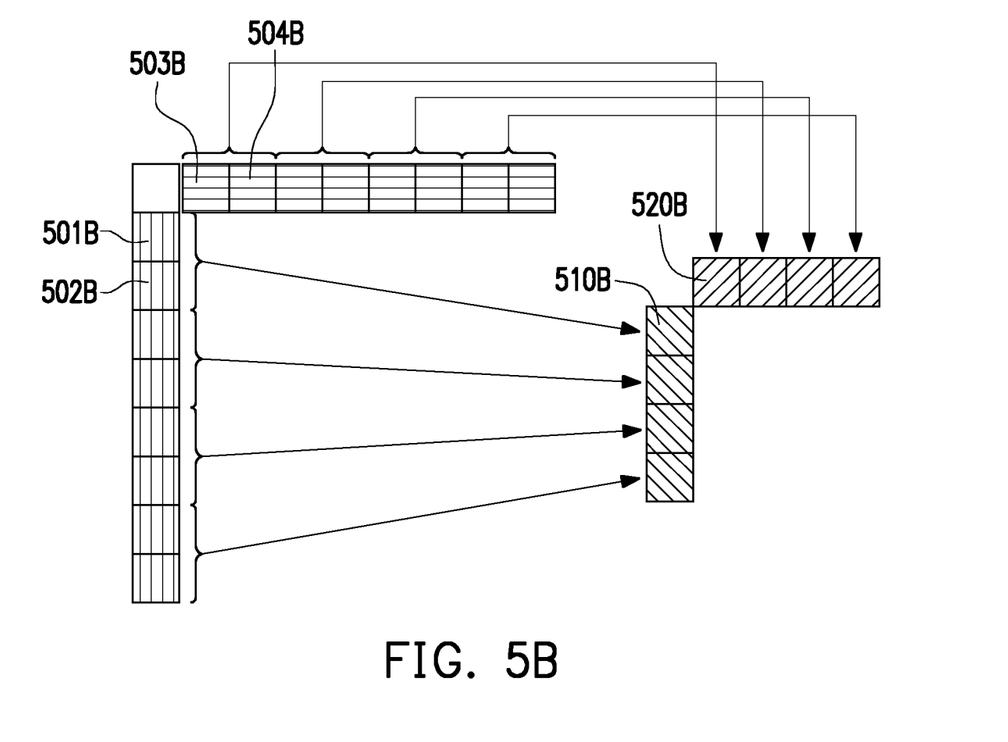

Referring to FIG. 5B, it is assumed that the size of the coding unit is 8×8, and the boundary sizes of the reference boundaries are respectively 8. The split sizes will be respectively 4, and the filter index corresponds to the $2^{nd}$-tap mean filter. Taking boundary blocks 501B and 502B in the left reference column as an example, a filtering result 510B is generated, and taking boundary blocks 503B and 504B in the top reference row as an example, a filtering result 520B is generated, and the other boundary blocks may be deduced by analogy. The combinations of the two reference boundaries are respectively 4.

Figure 5C:
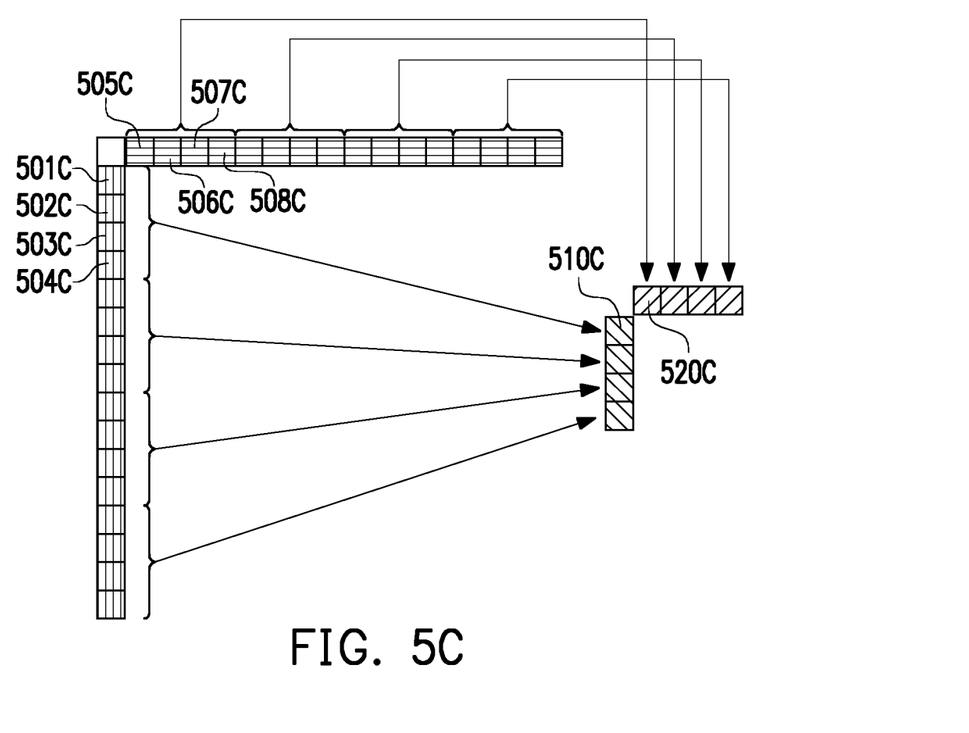

Referring to FIG. 5C, it is assumed that the size of the coding unit is 16×16, and the boundary sizes of the reference boundaries are respectively 16. The split sizes will be respectively 4, and the filter index corresponds to the $4^{th}$-tap mean filter. Taking boundary blocks 501C, 502C, 503C and 504C in the left reference column as an example, a filtering result 510C is generated, and taking boundary blocks 505C, 506C, 507C and 508C in the top reference row as an example, a filtering result 520C is generated, and the other boundary blocks may be deduced by analogy. The combinations of the two reference boundaries are respectively 4.

Figure 5D:
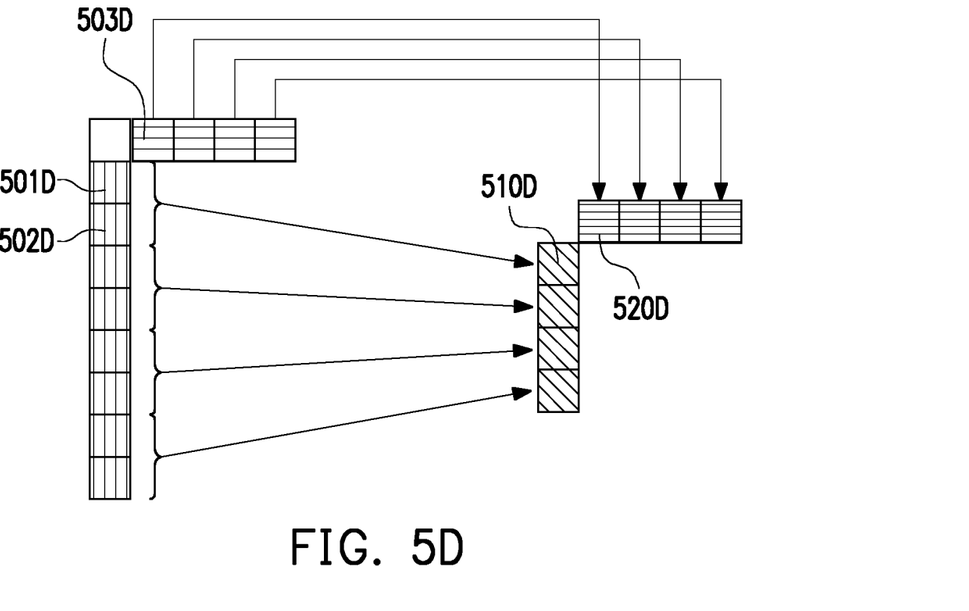

Referring to FIG. 5D, it is assumed that the size of the coding unit is 8×4, and the boundary sizes of the reference boundaries are respectively 8 and 4. The split sizes will be respectively 2 and 1, and the filter indexes respectively correspond to the $2^{nd}$-tap mean filter and the bypass filter (no filtering). Taking boundary blocks 501D and 502D in the left reference column as an example, a filtering result 510D with a filtering reference value is generated, and taking a boundary block 503D in the top reference row as an example, a filtering result 520D thereof is the same as the boundary block 503D before filtering, and the other boundary blocks may be deduced by analogy. The combinations of the two reference boundaries are respectively 4.

Referring back to FIG. 3, after the processor 120 selects the corresponding filters in allusion to the top reference row BT and the left reference column BL to perform the filtering operations, filtering reference values $BD_{red}$ are generated, and a matrix vector multiplication operation 320 is performed on the filtering reference values $BD_{red}$. In the exemplary embodiment, the processor 120 calculates down-sampling prediction values of the current coding unit CU according to the filtering reference values $BD_{red}$, a preset matrix, and a preset offset vector to generate a down-sampling prediction sample $PRED_{red}$. The processor 120 may calculate the down-sampling prediction sample $PRED_{red}$ according to a following equation (4):

$$PRED_{red} = A \cdot BD_{red} + b \quad \text{equation (4)}$$

Where, A and b are a preset matrix and a preset offset vector corresponding to a specific mode. In detail, the preset matrix and the preset offset vector correspond to a plurality of pre-stored training models, and each of the training models corresponds to a different matrix weighted intra prediction (MIP) mode. The mode that may be selected by the current coding unit CU is related to its size. For example, when W=H=4, the number of modes is 35, when max(W, H)=8, the number of modes is 19, and when max(W,H)>8, the number of modes is 11. Then, the processor 120 performs an interpolation operation 330 according to the down-sampling prediction sample $PRED_{red}$ to generate interpolated prediction values PRED of the current coding unit CU.

Figure 6:
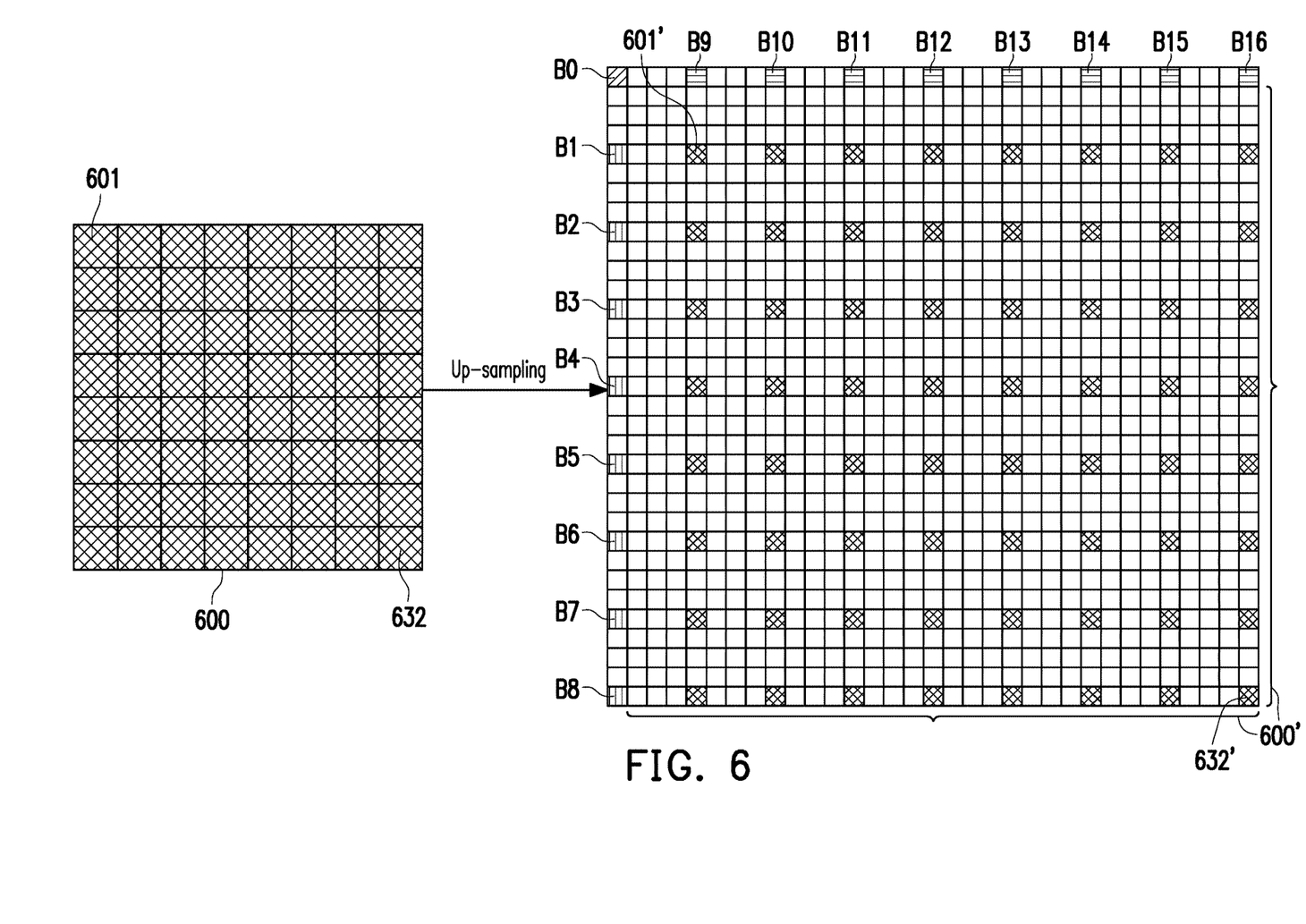
FIG. 6 is a schematic diagram of up-sampling processing according to an exemplary embodiment of the disclosure.

To be specific, the processor 120 performs up-sampling processing on the down-sampling prediction sample $PRED_{red}$ to generate a prediction sample of the current coding unit CU, where each of the down-sampling prediction values is equidistantly arranged in the prediction sample. FIG. 6 is a schematic diagram of up-sampling processing according to an exemplary embodiment of the disclosure, after a down-sampling prediction sample 600 is subjected to the up-sampling processing, a prediction sample 600' is generated, where the down-sampling prediction values are equidistantly arranged in the prediction sample 600'. For example, the down-sampling prediction values corresponding to positions 601 and 632 of the down-sampling prediction sample 600 are respectively arranged at positions 601' and 632' of the prediction sample 600'. Boundary blocks B0-B16 in a top row and a left column of the prediction sample 600 are configured with original edge values (pixel values) corresponding to the same positions on the reference boundaries. Then, the processor 120 performs interpolation operations on the prediction sample according to the original edge values and the down-sampling prediction values to generate interpolated sample prediction values of the prediction sample.

In an exemplary embodiment, the processor 120 divides the prediction sample into a plurality of interpolation modules according to the size of the current coding unit and a size of the down-sampling prediction sample. Then, the processor 120 uses the original edge values and the down-sampling prediction values to perform linear interpolation on each interpolation module to generate the interpolated sample prediction values of the prediction sample. Thereafter, the processor 120 performs subsequent coding operations on the prediction sample having the down-sampling prediction values and the interpolated sample prediction values.

Figure 7:
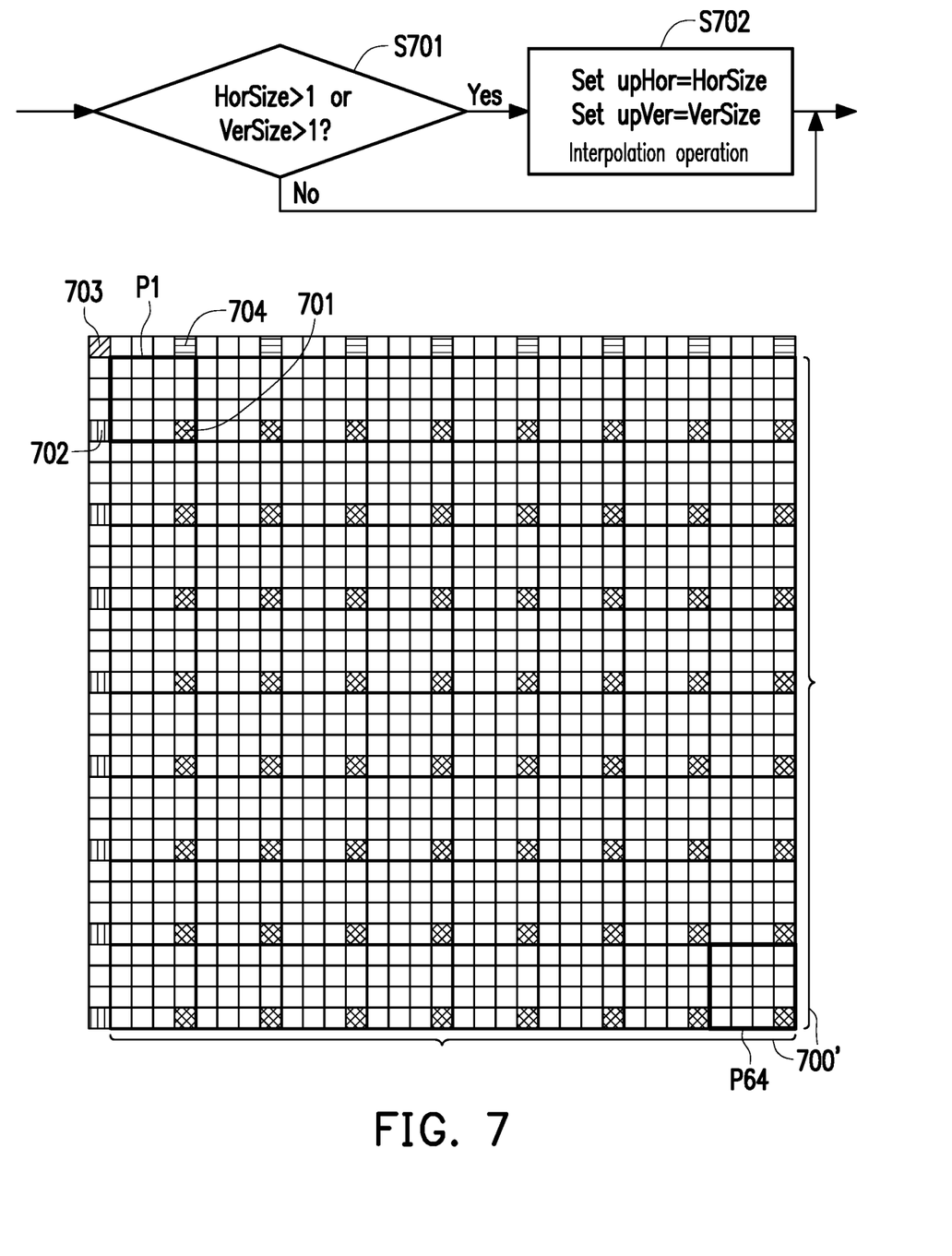
FIG. 7 is a flowchart illustrating a prediction sample and an interpolation operation thereof according to an exemplary embodiment of the disclosure.

To be specific, FIG. 7 is a flowchart illustrating a prediction sample and an interpolation operation thereof according to an exemplary embodiment of the disclosure.

Referring to FIG. 7, the prediction sample 700' is 32×32. The processor 120 determines whether either a width HorSize or a height VerSize to be interpolated is greater than 1 (step S701). If not, the processor 120 does not need to perform the interpolation operation on the prediction sample 700'. If yes, the processor 120 respectively sets a width upHor and a height upVer to be interpolated to HorSize and VerSize, and then performs the interpolation operation (step S702), where:

$$HorSize = \frac{W}{predSize},$$

$$VerSize = \frac{H}{predSize}$$

Where, $$predSize = \begin{cases} 4, & \max(W, H) \le 8 \\ 8, & \text{others} \end{cases}$$

According to another aspect, regarding each interpolation module divided by the processor 120, taking an interpolation module P1 as an example, a most lower right small block 701 in internal of the interpolation module P1, and a lower left small block 702, an upper left small block 703 and an upper right small block 704 located outside the interpolation module P1 are four known small blocks, and are composed of four of the original edge values and the down-sampling prediction values (in the embodiment, composed of three original edge values and one down-sampling prediction value).

Figure 8:
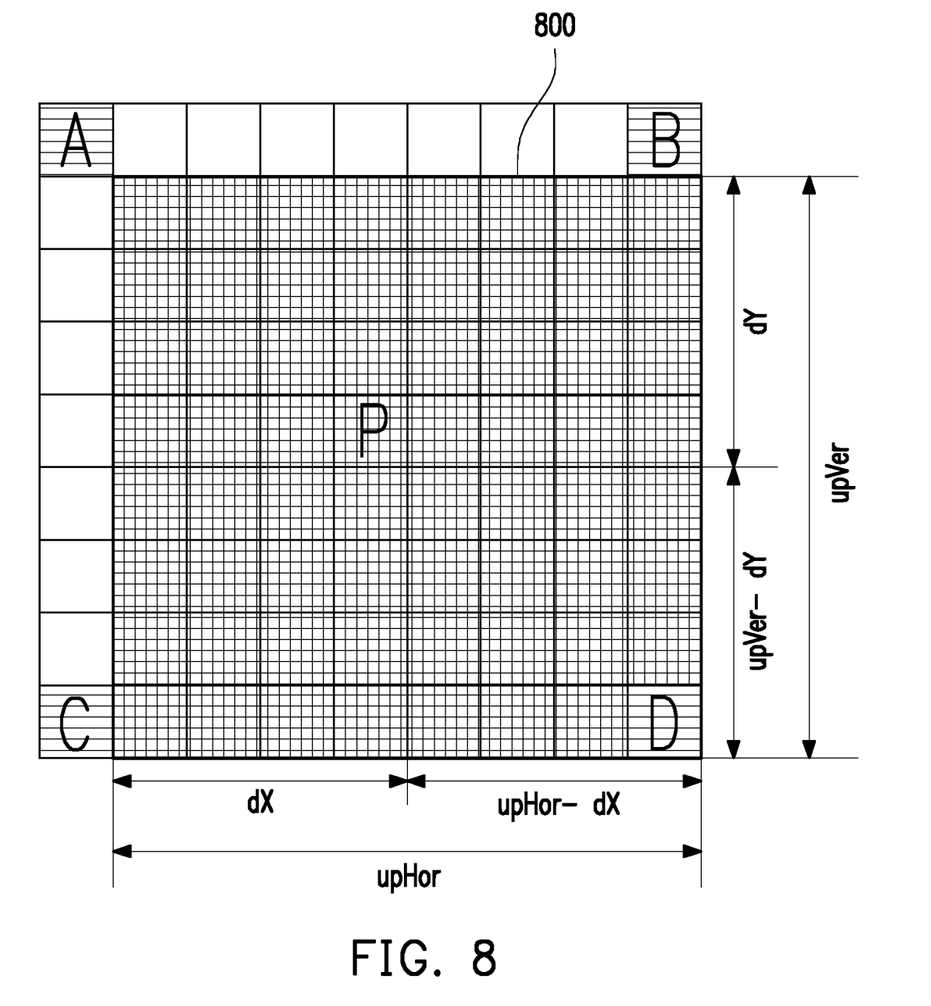
FIG. 8 is a schematic diagram of an interpolation operation according to an exemplary embodiment of the disclosure.

FIG. 8 is a schematic diagram of an interpolation operation according to an exemplary embodiment of the disclosure. It is assumed that small blocks A, B, C and D are four known small blocks, and respectively have values of a, b, c and d. Regarding the small block P of an interpolation range 800, it is assumed that dX is a horizontal distance between the small block P and a most upper left corner of the interpolation range, and dY is a vertical distance between the P point and the most upper left corner of the interpolation range, the prediction value P' of the small block P may be expressed by a following equation (5):

$$P' = \frac{(upHor - dX)(upVer - dY)a + dX(upVer - dY)b + dY(upHor - dX)c + dX \times dY \times d + \frac{upHor \times upVer}{2}}{upHor \times upVer} \quad \text{equation (5)}$$

In another exemplary embodiment, the processor 120 divides the prediction sample into a plurality of horizontal interpolation modules according to the size of the current coding unit and the size of the down-sampling prediction sample. Then, the processor 120 uses the original edge values and the down-sampling prediction values to perform linear interpolation on each horizontal interpolation module to generate horizontal interpolated sample prediction values of the prediction sample. Thereafter, the processor 120 divides the prediction sample into a plurality of vertical interpolation modules according to the size of the current coding unit and the size of the down-sampling prediction sample. Then, the processor 120 uses the original edge values, the down-sampling prediction values and the horizontal interpolated sample prediction values to perform linear interpolation on each vertical interpolation module to generate vertical interpolated sample prediction values of the prediction sample. Thereafter, the processor 120 performs subsequent coding on the prediction sample having the down-sampling prediction values, the horizontal interpolated sample prediction values, and the vertical interpolated sample prediction values.

Figure 9:
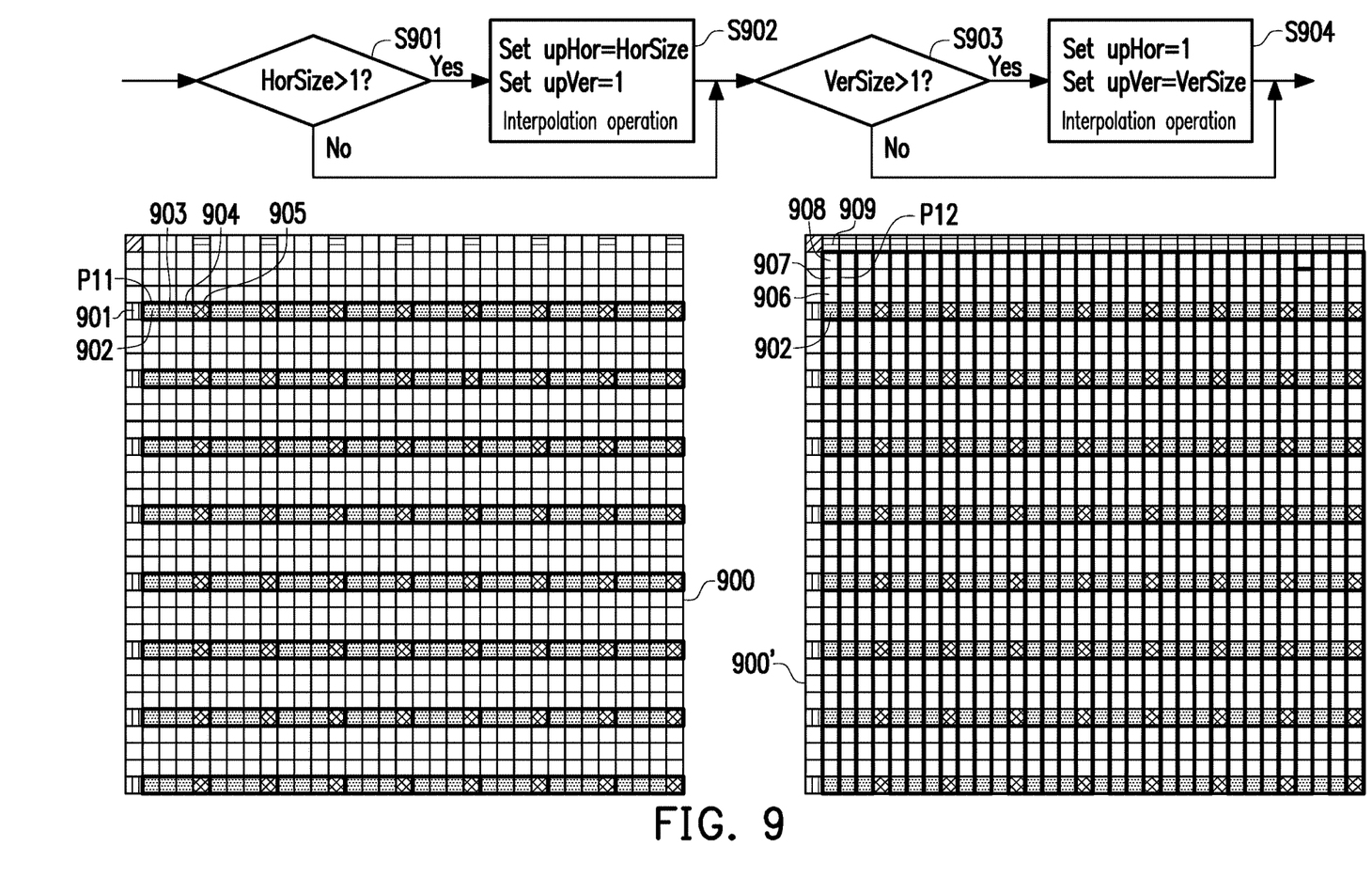
FIG. 9 is a flowchart illustrating a prediction sample and an interpolation operation thereof according to an exemplary embodiment of the disclosure.

To be specific, FIG. 9 is a flowchart illustrating a prediction sample and an interpolation operation thereof according to an exemplary embodiment of the disclosure.

Referring to FIG. 9, the prediction sample 900 is 32×32. Regarding each horizontal interpolation module, the processor 120 determines whether a width HorSize to be interpolated is greater than 1 (step S901). If not, the processor 120 does not need to perform the horizontal interpolation operation on the prediction sample 900. If yes, the processor 120 respectively sets a width upHor and a height upVer to be interpolated to HorSize and 1, and then performs the interpolation operation (step S902). Then, regarding each vertical interpolation module, the processor 120 determines whether a height VerSize to be interpolated is greater than 1 (step S903). If not, the processor 120 does not need to perform vertical interpolation operation on the prediction samples 900'. If yes, the processor 120 respectively sets the width upHor and height upVer to be interpolated to 1 and VerSize, and then performs the interpolation operations.

According to another aspect, regarding each horizontal interpolation module divided by the processor 120, taking a horizontal interpolation module P11 with small blocks 902-905 as an example, the rightmost small block 905 in internal of the horizontal interpolation module P11, and a left small block 901 located outside the horizontal interpolation module P11 are two known small blocks, and are composed of two of the original edge values and the down-sampling prediction values (in the embodiment, composed of one original edge value and one down-sampling prediction value). The horizontal interpolated sample prediction values of the small blocks 902-904 may be calculated in a way of linear interpolation operation. It should be noted that, if the equation (5) is set to upVer=1, dY=1, the prediction value P' of the small blocks may be expressed by a following equation (5.1):

$$P' = \frac{(upHor - dX)c + dX \times d + \frac{upHor}{2}}{upHor} \quad \text{equation (5.1)}$$

Regarding the horizontal interpolation module P11, c and d are respectively values of the two known small blocks 901 and 905.

Similarly, regarding each vertical interpolation module divided by the processor 120, taking a vertical interpolation module P12 with small blocks 902, 906-908 as an example, the lowermost small block 902 in internal of the vertical interpolation module P12, and an upper small block 909 located outside the vertical interpolation module P12 are two known small blocks, and are composed of two of the original edge values and the horizontal interpolated sample prediction values (in the embodiment, composed of one original edge value and one horizontal interpolated sample prediction value). The vertical interpolated sample prediction values of the small blocks 906-908 may be calculated in a way of linear interpolation operation. It should be noted that, if the equation (5) is set to upHor=1, dX=1, the prediction value P' of the small blocks may be expressed by a following equation (5.2):

$$P' = \frac{(upVer - dY)b + dY \times d + \frac{upVer}{2}}{upVer} \quad \text{equation (5.2)}$$

Regarding the vertical interpolation module P12, b and d are respectively values of the two known small blocks 909 and 902.

In another exemplary embodiment, the processor 120 may first divide the prediction sample into vertical interpolation modules to perform linear interpolation, and then divide the prediction sample into horizontal interpolation modules to perform linear interpolation. In detail, the processor 120 divides the prediction sample into a plurality of vertical interpolation modules according to the size of the current coding unit and the size of the down-sampling prediction sample. Then, the processor 120 uses the original edge values and the down-sampling prediction values to perform linear interpolation on each vertical interpolation module to generate vertical interpolated sample prediction values of the prediction sample. Thereafter, the processor 120 divides the prediction sample into a plurality of horizontal interpolation modules according to the size of the current coding unit and the size of the down-sampling prediction sample. Then, the processor 120 uses the original edge values, the down-sampling prediction values and the vertical interpolated sample prediction values to perform linear interpolation on each horizontal interpolation module to generate horizontal interpolated sample prediction values of the prediction sample. Then, the processor 120 performs subsequent coding on the prediction sample having the down-sampling prediction values, the horizontal interpolated sample prediction values, and the vertical interpolated sample prediction values.

In summary, the disclosure provides a method and an image processing apparatus for video coding, which adopt filter selection and interpolation operations to reduce the amount of complicated calculations under a premise of not losing the accuracy of intra-prediction, so as to effectively improve video coding performance.

What is claimed is:
1. A method for video coding, adapted for an image processing apparatus, and comprising:
   receiving a current coding unit;
   performing filter selection according to a size of the current coding unit;
   using at least one selected filter to perform a filtering operation on a plurality of reference boundaries of the current coding unit to generate a plurality of filtering reference values; and
   performing an interpolation operation on the current coding unit according to the filtering reference values to generate a plurality of interpolated prediction values;
   wherein the step of performing filter selection according to the size of the current coding unit comprises:
      calculating a combination of each of the reference boundaries of the current coding unit according to the size of the current coding unit;
      calculating a split size of the current coding unit according to the boundary size and the combination of each of the reference boundaries of the current coding unit; and
      calculating at least one filter index of the current coding unit according to the split size of the current coding unit, wherein each of the at least one filter index corresponds to one of the plurality of filters.

2. The method for video coding as claimed in claim 1, wherein the step of calculating the combination of each of the reference boundaries of the current coding unit according to the size of the current coding unit comprises:
   determining whether a width and a height of the current coding unit are both 4;
   if yes, setting the combination of each of the reference boundaries of the current coding unit to 2; and
   if not, setting the combination of each of the reference boundaries of the current coding unit to 4.

3. The method for video coding as claimed in claim 1, wherein the step of calculating the split size of the current coding unit according to the boundary size and the combination of each of the reference boundaries of the current coding unit comprises:

performing a dividing operation on the boundary size and the combination of each of the reference boundaries of the current coding unit to generate the split size of the current coding unit.

4. The method for video coding as claimed in claim 1, wherein the step of calculating the at least one filter index of the current coding unit according to the split size of the current coding unit comprises:
performing a logarithm operation on the split size of the current coding unit to generate the at least one filter index of the current coding unit.

5. The method for video coding as claimed in claim 1, wherein the selected filter is selected from a plurality of smooth filters of different taps.

6. The method for video coding as claimed in claim 5, wherein smooth filters of different taps comprise a bypass filter and 2N-tap mean filter, wherein N is 1, 2, 3 and 4.

7. The method for video coding as claimed in claim 1, wherein the reference boundaries are a top reference row and a left reference column of the current coding unit, and the step of using the at least one selected filter to perform the filtering operation on each of the reference boundaries of the current coding unit to generate the filtering reference values comprises:
using each of the at least one selected filter to respectively perform the filtering operation on the top reference row and the left reference column of the current coding unit to respectively generate the filtering reference values.

8. The method for video coding as claimed in claim 1, wherein the step of performing the interpolation operation on the current coding unit according to the filtering reference values to generate the interpolated prediction values comprises:
calculating a plurality of down-sampling prediction values of the current coding unit according to the filtering reference values, a preset matrix, and a preset offset vector to generate a down-sampling prediction sample; and
generating the interpolated prediction values according to a plurality of original edge values of the reference boundaries and the down-sampling prediction sample.

9. The method for video coding as claimed in claim 8, wherein the preset matrix and the preset offset vector are related to the size of the current coding unit.

10. The method for video coding as claimed in claim 8, wherein the step of generating the interpolated prediction values according to the original edge values of the reference boundaries and the down-sampling prediction sample comprises:
performing up-sampling processing on the down-sampling prediction sample to generate a prediction sample of the current coding unit, wherein each of the down-sampling prediction values is equidistantly arranged in the prediction sample;
arranging the original edge values of the reference boundaries to a position corresponding to a top row and a left column of the prediction sample;
performing the interpolation operation on the prediction sample according to the original edge values and the down-sampling prediction values to generate an interpolated sample prediction value of the prediction sample; and
setting the down-sampling prediction values and the interpolated sample prediction value in the prediction sample as the interpolated prediction values.

11. The method for video coding as claimed in claim 10, wherein the step of performing the interpolation operation on the prediction sample according to the original edge values and the down-sampling prediction values of the reference boundaries comprises:
dividing the prediction sample into a plurality of interpolation modules according to the size of the current coding unit and a size of the down-sampling prediction sample; and
performing linear interpolation on each of the interpolation modules by using the original edge values and the down-sampling prediction values to generate the interpolated sample prediction value of the prediction sample.

12. The method for video coding as claimed in claim 11, wherein regarding each of the interpolation modules, a most lower right small block in internal of the each of the interpolation modules, and a lower left small block, an upper left small block and an upper right small block located outside the each of the interpolation modules are four known small blocks, and are composed of four of the original edge values and the down-sampling prediction values.

13. The method for video coding as claimed in claim 10, wherein the step of performing the interpolation operation on the prediction sample according to the original edge values and the down-sampling prediction values of the reference boundaries comprises:
dividing the prediction sample into a plurality of horizontal interpolation modules according to the size of the current coding unit and a size of the down-sampling prediction sample, wherein a height of each of the horizontal interpolation modules is 1;
performing linear interpolation on each of the horizontal interpolation modules by using the original edge values and the down-sampling prediction values to generate a plurality of horizontal interpolated sample prediction values of the prediction sample;
dividing the prediction sample into a plurality of vertical interpolation modules according to the size of the current coding unit and the size of the down-sampling prediction sample, wherein a width of each of the vertical interpolation modules is 1;
performing linear interpolation on each of the vertical interpolation modules by using the original edge values, the down-sampling prediction values and the horizontal interpolated sample prediction values to generate a plurality of vertical interpolated sample prediction values of the prediction sample; and
setting the down-sampling prediction values, the horizontal interpolated sample prediction values and the vertical interpolated sample prediction values in the prediction sample as the interpolated prediction values.

14. The method for video coding as claimed in claim 13, wherein regarding each of the horizontal interpolation modules, a rightmost small block in internal of the each of the horizontal interpolation modules, and a left small block located outside the each of the horizontal interpolation modules are composed of two of the original edge values and the down-sampling prediction values; and
regarding each of the vertical interpolation modules, a lowermost small block in internal of the each of the vertical interpolation modules, and an upper small block located outside the each of the vertical interpolation modules are composed of two of the original edge values, the down-sampling prediction values and the horizontal interpolated sample prediction values.

15. The method for video coding as claimed in claim 10, wherein the step of performing the interpolation operation on the prediction sample according to the original edge values and the down-sampling prediction values of the reference boundaries comprises:
- dividing the prediction sample into a plurality of vertical interpolation modules according to the size of the current coding unit and a size of the down-sampling prediction sample, wherein a width of each of the vertical interpolation modules is 1;
- performing linear interpolation on each of the vertical interpolation modules by using the original edge values and the down-sampling prediction values to generate a plurality of vertical interpolated sample prediction values of the prediction sample;
- dividing the prediction sample into a plurality of horizontal interpolation modules according to the size of the current coding unit and the size of the down-sampling prediction sample, wherein a height of each of the horizontal interpolation modules is 1;
- performing linear interpolation on each of the horizontal interpolation modules by using the original edge values, the down-sampling prediction values and the vertical interpolated sample prediction values to generate a plurality of horizontal interpolated sample prediction values of the prediction sample; and
- setting the down-sampling prediction values, the horizontal interpolated sample prediction values and the vertical interpolated sample prediction values in the prediction sample as the interpolated prediction values.

16. An image processing apparatus, comprising:
a memory, configured to store data; and
a processor, coupled to the memory, and configured to:
  receive a current coding unit;
  perform filter selection according to a size of the current coding unit;
  use at least one selected filter to perform a filtering operation on a plurality of reference boundaries of the current coding unit to generate a plurality of filtering reference values; and
  perform an interpolation operation on the current coding unit according to the filtering reference values to generate a plurality of interpolated prediction values;
  wherein the step of performing filter selection according to the size of the current coding unit comprises:
    calculating a combination of each of the reference boundaries of the current coding unit according to the size of the current coding unit;
    calculating a split size of the current coding unit according to the boundary size and the combination of each of the reference boundaries of the current coding unit; and
    calculating at least one filter index of the current coding unit according to the split size of the current coding unit, wherein each of the at least one filter index corresponds to one of the plurality of filters.

17. The image processing apparatus as claimed in claim 16, wherein the processor calculates a plurality of down-sampling prediction values of the current coding unit according to the filtering reference values, a preset matrix, and a preset offset vector to generate a down-sampling prediction sample, and generates the interpolated prediction values according to a plurality of original edge values of the reference boundaries and the down-sampling prediction sample.

* * * * *